United States Patent
Coudert

(10) Patent No.: US 12,241,958 B1
(45) Date of Patent: Mar. 4, 2025

(54) INCORPORATING RADAR TECHNOLOGY IN A TIME-DIVISION DUPLEX RADIO ACCESS NETWORK

(71) Applicant: T-Mobile Innovations LLC, Overland Park, KS (US)

(72) Inventor: Oliver P Coudert, Arlington, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 813 days.

(21) Appl. No.: 17/231,334

(22) Filed: Apr. 15, 2021

(51) Int. Cl.
*G01S 13/52* (2006.01)
*G01S 7/00* (2006.01)
*G01S 13/00* (2006.01)
*G08G 1/16* (2006.01)
*H04L 5/14* (2006.01)

(52) U.S. Cl.
CPC ............ *G01S 13/003* (2013.01); *G01S 7/006* (2013.01); *G01S 13/52* (2013.01); *G08G 1/164* (2013.01); *H04L 5/14* (2013.01)

(58) Field of Classification Search
CPC ........ G01S 13/003; G01S 7/006; G01S 13/52; G08G 1/164; H04L 5/14
See application file for complete search history.

(56) References Cited

U.S. PATENT DOCUMENTS

| 4,568,939 | A  | * | 2/1986 | Grau | G01S 13/5242 342/159 |
|---|---|---|---|---|---|
| 2011/0298603 | A1 | * | 12/2011 | King | G08G 1/042 340/436 |
| 2015/0063321 | A1 | * | 3/2015 | Sadek | H04L 5/0062 370/336 |
| 2018/0248613 | A1 | * | 8/2018 | Peitzer | H04B 17/12 |
| 2021/0195435 | A1 | * | 6/2021 | Rimini | H04B 1/3838 |
| 2022/0022056 | A1 | * | 1/2022 | Park | G01S 7/006 |
| 2022/0256519 | A1 | * | 8/2022 | Jeon | H04W 72/0453 |
| 2022/0258729 | A1 | * | 8/2022 | Kim | H04W 4/40 |
| 2023/0085465 | A1 | * | 3/2023 | Lee | H04W 72/0453 370/329 |
| 2023/0228593 | A1 | * | 7/2023 | Mou | G01C 21/3811 701/409 |

* cited by examiner

*Primary Examiner* — Timothy A Brainard
*Assistant Examiner* — Ismaaeel A. Siddiquee
(74) *Attorney, Agent, or Firm* — Shook, Hardy & Bacon L.L.P.

(57) ABSTRACT

System and method are provided to incorporate radar technology in a time-division duplex radio access network. Information in the guard period between the downlink transmission and uplink transmission, such as the capturing of the UL RF signal landscape, is modified to capture radar signals (RF signals) that reflect from objects. The reflected radar signals are stored, process, and analyzed by a connected computer to determine stationary and moving objects.

20 Claims, 6 Drawing Sheets

INCORPORATING RADAR TECHNOLOGY IN A TIME-DIVISION DUPLEX RADIO ACCESS NETWORK

CROSS-REFERENCE TO RELATED APPLICATIONS

None.

SUMMARY

The goal is to incorporate radar concepts in the radio access network (RAN) and use them to capture "snapshots" of the radio frequency (RF) environment. The "snapshots" will provide a picture of the network environment (i.e. sense reflections, identify where objects are located, identify obstacles that might block a signal, or identify a location of interference). The differences between the "snapshots" can aid in indicating movement of things, such as vehicles, drones, or people.

BRIEF DESCRIPTION OF THE DRAWINGS

Illustrative embodiments of the present invention are described in detail below with reference to the attached drawing figures, and wherein.

DETAILED DESCRIPTION

Figure 1:
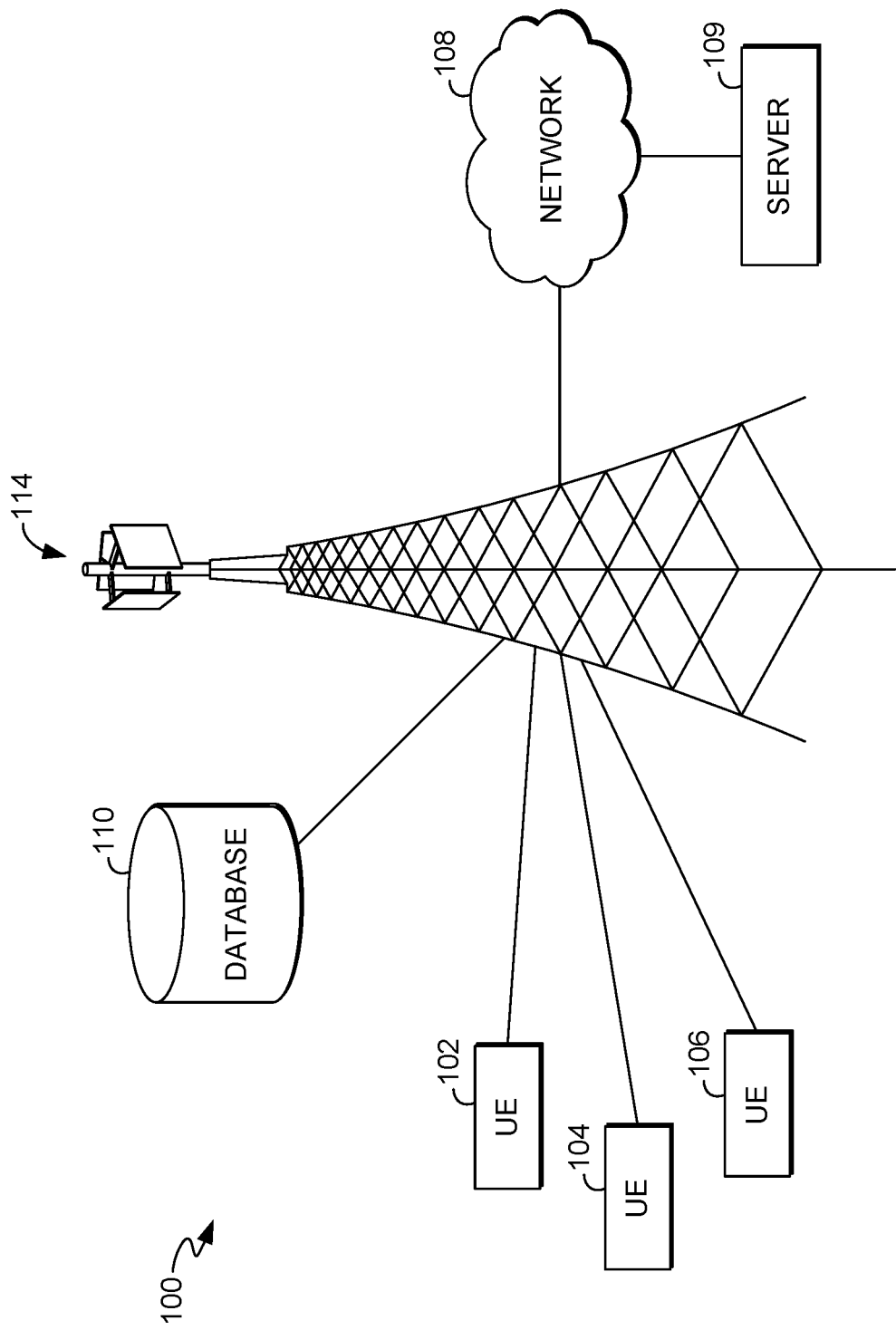
FIG. 1 depicts an exemplary wireless telecommunications network, according to an implementation of an embodiment of the present invention.

The subject matter of embodiments of the invention is described with specificity herein to meet statutory requirements. However, the description itself is not intended to limit the scope of this patent. Rather, the inventor has contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
BS Base Station
BTS Base Transceiver Station
CD-ROM Compact Disk Read Only Memory
CDMA Code Division Multiple Access
CDMA2000 Code Division Multiple Access 2000
DL Downlink
eNodeB Evolved Node B
gNodeB Next Generation Node B
GPRS General Packet Radio Service
GSM Global System for Mobile communications
DVD Digital Versatile Discs
EEPROM Electrically Erasable Programmable Read Only Memory
HSDPA High-Speed Downlink Packet Access
IoT Internet of Things
LED Light Emitting Diode
LTE Long Term Evolution
MD Mobile Device
PC Personal Computer
PCS Personal Communications Service
PDA Personal Digital Assistant
RAM Random Access Memory
RF Radio-Frequency
RFI Radio-Frequency Interference
ROM Read Only Memory
SMS Short Message Service
TDD Time Division Duplex
TDMA Time Division Multiple Access
TXRU Transceiver (or Transceiver Unit)
UE User Equipment
UL Uplink
UMTS Universal Mobile Telecommunications Service
WCDMA Wideband Code Division Multiple Access
WiMAX Worldwide Interoperability for Microwave Access Further, various technical terms are used throughout this description. An illustrative resource that fleshes out various aspects of these terms can be found in Newton's Telecom Dictionary, 31st Edition (2018).

In a first aspect, a system for incorporating radar technology in a time-division duplex (TDD) radio access network (RAN) is provided and uses a guard period for sensing. The RAN is configured to operate in a wireless telecommunication network to implement a radio access technology. The wireless telecommunication network includes base transceiver stations (BTSs) and user equipment (UEs). At least one computing device is configured to communicate with the RAN. The BTSs are configured to send a downlink (DL) transmission in a first TDD subframe to the UEs. The BTSs are configured to receive an uplink (UL) transmission in a second TDD subframe from the UEs. The guard period is configured to occur between the DL transmission and the UL transmission. The BTSs capture information about an uplink radio frequency (RF) environment during the guard period. As the DL transmissions, guard periods, and UL transmissions occur, the BTSs capture information during guard periods. The BTSs send the information to the one computing device. A member of the information represents information from a particular guard period. The information represents a reflection of radio waves that identifies objects.

The radio waves are RF signals. The objects are stationary objects and moving objects. The one computing device analyzes the information. The one computing device compares a first member of the information from a first guard period at a BTS to a second member of the information from a second guard period at the BTS to determine a movement of a moving object and to determine a stationary object. The determination of the movement of the moving object includes the determination of a velocity of the moving object and the determination of a movement direction of the moving object. The RAN provides instructions to perform a handover from one BTS to another BTS before the moving object encounters a signal-blocking object. The one computing device maps stationary objects from a perspective of each cell site in a wireless coverage area and provides a graphical representation of the stationary objects in a map to a graphical user interface. The RAN is configured to send instructions to the BTSs to transmit RF signals in order to obtain reflected RF signals from the stationary objects and moving objects. The system is configured to maintain safety of vehicles within a wireless coverage area. The system provides a notice to the moving object to avoid a collision with an obstacle. The system is configured to identify a change to an antenna when positions of stationary objects shift in a same direction, which correlate to the antenna being realigned.

In a second aspect, a method for incorporating radar technology in a time-division duplex (TDD) radio access network (RAN), using a guard period for sensing, is provided that includes configuring the RAN to operate in a wireless telecommunication network to implement a radio access technology. The wireless telecommunication network includes a plurality of base transceiver stations (BTSs) and a plurality of user equipment (UEs). At least one computing device is configured to communicate with the RAN. The plurality of BTSs is configured to send a downlink (DL) transmission in a first TDD subframe to the plurality of UEs. The plurality of BTSs is configured to receive an uplink (UL) transmission in a second TDD subframe from the plurality of UEs. The guard period is configured to occur between the DL transmission and the UL transmission. The plurality of BTSs is modified to capture signal information during the guard period. The plurality of BTSs captures the signal information about an uplink radio frequency (RF) environment during the guard period. The signal information is sent from the plurality of BTSs to the at least one computing device for storage and processing. A plurality of signal information is captured by the plurality of BTSs during a plurality of guard periods. The signal information is sent from the plurality of BTSs to the one computing device for storage and processing. A member of the plurality of signal information represents signal information from a particular guard period. The plurality of signal information represents a reflection of radio waves that identifies a plurality of objects. The radio waves are RF signals. The plurality of objects are stationary objects and moving objects. The plurality of signal information is analyzed by the one computing device to compare a first member of the plurality of signal information from a first guard period at a BTS to a second member of the plurality of signal information from a second guard period at the BTS, determine a movement of a moving object, and determine a stationary object. A velocity and a movement direction of the moving object are determined. Instructions are provided to perform a handover from one BTS to another BTS by the RAN before the moving object encounters a signal-blocking object. Stationary objects are mapped by the one computing device from a perspective of each cell site in a wireless coverage area and a graphical representation of the map is provided to a graphical user interface. The RAN is configured to send instructions to the plurality of BTSs to transmits RF signals in order to obtain reflected RF signals from stationary objects and moving objects. The RAN is configured to maintain safety of vehicles within a wireless coverage area. A notice is provided to the moving object to avoid a collision with an obstacle. The RAN is configured to identify a change to an antenna when positions of a plurality of stationary objects shift in a same direction, correlating to the antenna being realigned. Findings and calculations are reported by the one computing device to support systems of the RAN.

In a third aspect, a system for incorporating radar technology in a time-division duplex (TDD) radio access network (RAN), using the guard period for sensing, is provided. Base transceiver stations (BTS) operate in a wireless telecommunication network. Each BTS sends DL transmissions to user equipment (UEs) in a coverage area for the BTS and receives UL transmissions from the UEs. Each BTS is configured to sense signal information during the guard period. The guard period occurs between the DL transmission and the UL transmission. Each BTS captures signal information during the guard period and sends the signal information to at least a computing device in communication with each BTS. The signal information represents RF signals that identify stationary objects and moving objects. The RAN is configured to send instructions to the BTSs to transmit RF signals in order to obtain reflected RF signals from the stationary objects and moving objects. The computing device analyzes the signal information to compare signal information from different guard periods or successive guard periods, to determine a movement of the moving object, and to determine the stationary object.

As used herein, user equipment (UE) (also referenced herein as a user device) can include any device employed by an end-user to communicate with a wireless telecommunication network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gauge, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station or access point. A UE can be, in an embodiment, similar to computing device 600 described herein with respect to FIG. 6.

Referring to FIG. 1, an exemplary network environment suitable for use in implementing embodiments of the present disclosure is provided. Such a network environment as illustrated in FIG. 1 is designated generally as network environment 100. Network environment 100 is but one example of a suitable network environment and is not intended to suggest any limitation as to the scope of use or functionality of the disclosure. Neither should network environment 100 be interpreted as having any dependency or requirement relating to any one or combination of components illustrated.

Network environment 100 includes user devices 102, 104, and 106, access point 114 (which may be a cell site, base transceiver station (also known as a base station), communication tower, a small cell, or the like), network 108, computing device 109, and database 110. In network environment 100, user devices can take on a variety of forms, such as a personal computer (PC), a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 109 or the computing device 600 of FIG. 6) that communicates via wireless communications with the access point 114 in order to interact with a public or private network. In this regard, the user device can be any mobile computing device that communicates by way of a wireless network, for example, a 3G network (e.g., CDMA, CDMA2000, WCDMA, GSM, UMTS), a 4G network (WiMAX, LTE, HSDPA), a 5G network, or any other type of network.

In some cases, the user devices 102, 104, and 106 in network environment 100 can optionally utilize network 108 to communicate with other computing devices (e.g., a mobile device(s), a server(s), a personal computer(s), etc.) through access point 114. The network 108 may be a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network 108 can include multiple networks, as well as being a network of networks, but is shown in more simple form so as to not obscure other aspects of the present disclosure.

Continuing, network 108 can be part of a telecommunication network that connects subscribers to their immediate service provider. In some instances, network 108 can be associated with a telecommunications provider that provides services to user devices 102, 104, and 106. For example, network 108 may provide voice, SMS, or data services to user devices corresponding to users that are registered or subscribed to utilize the services provided by a telecommunications provider. Similarly, network 108 may provide services to user devices that correspond to relays, fixed sensors, internet of things (IoT) enabled devices, or any other device that provide connectivity or data to other devices. Network 108 can comprise any communication network providing voice, SMS, and/or data service(s), such as, for example, a 3G network (e.g., CDMA, CDMA2000, WCDMA, GSM, UMTS), a 4G network (WiMAX, LTE, HSDPA), or a 5G network.

Generally, access point 114 is configured to communicate with user devices, such as user devices 102, 104, and 106 that are located within the geographical area, or cell, covered by radio antennas of a cell site (i.e. access point 114). Access point 114 can include one or more base stations (such as a gNodeB), base transmitter stations, radios, antennas, antenna arrays, power amplifiers, transmitters/receivers, digital signal processors, control electronics, GPS equipment, and the like. Access point 114 can include a wireless communications station that is installed at a fixed location, (e.g., a telecommunication tower) or a mobile base station (e.g., small cell) in some embodiments. In some embodiments, access point 114 also includes or is associated with an LTE System Manager (LSM) configured to manage a master list (e.g., a table) of amplitude weights. The list of amplitude weights may include a plurality of amplitude, phase, and power weights applicable to a plurality of antennas, antenna model numbers, radios, tilt angles of antennas, and the like. The listing may also include amplitude, phase, and power weights applicable to various broadcast configurations, such as multi-beam or unified beam.

Illustrative wireless telecommunications technologies include CDMA, CDMA2000, GPRS, TDMA, GSM, WCDMA, UMTS, and the like. Radio 616 might additionally or alternatively facilitate other types of wireless communications including Wi-Fi, WiMAX, LTE, 5G, or other VOIP communications. As can be appreciated, in various embodiments, radio 616 can be configured to support multiple technologies and/or multiple radios can be utilized to support multiple technologies.

Figure 2:
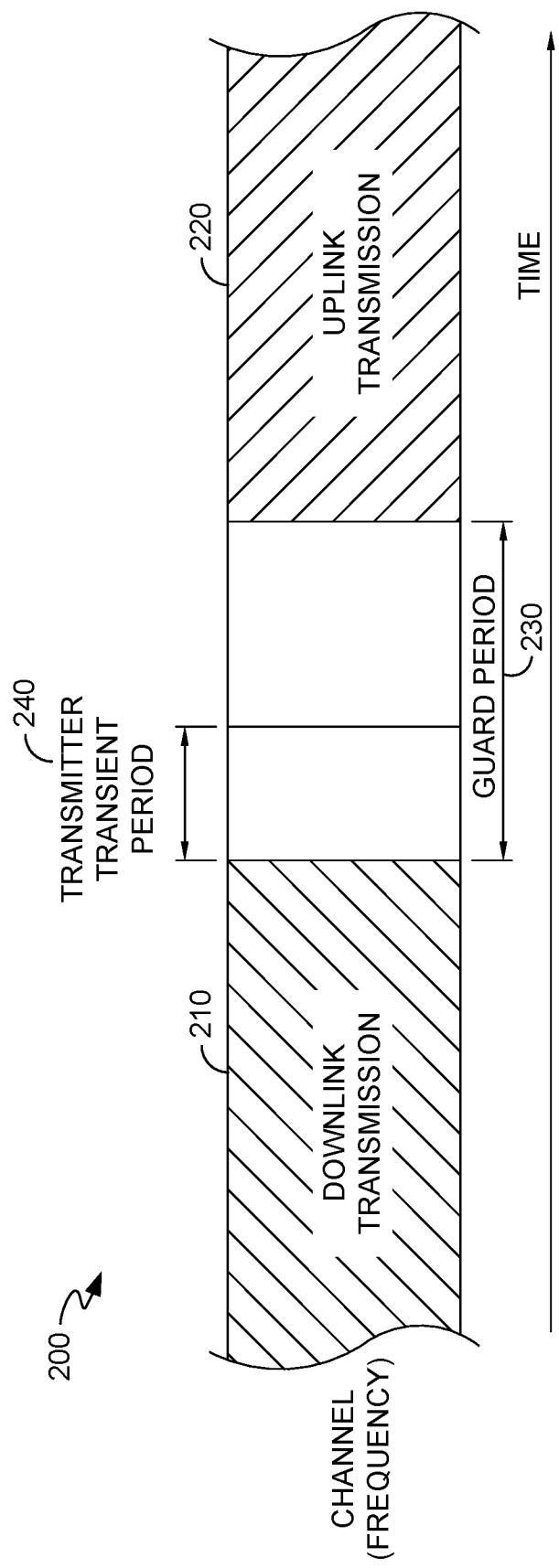
FIG. 2 depicts an exemplary time-division duplex (TDD) transition between downlink and uplink transmissions, according to an implementation of an embodiment of the present invention.

Turning now to FIG. 2, an exemplary TDD transition 200 is shown with a downlink (DL) transmission 210, an uplink (UL) transmission 220, and a guard period 230 between DL transmission 210 and UL transmission 220. In embodiments, guard period 230 is the time between DL transmission 210 and the UL transmission 220. However, in other embodiments, the time between DL transmission and UL transmission may be shown as a downlink pilot time slot (DwPTS), followed by the guard period, followed by the uplink pilot time slot (UpPTS). For simplicity, guard period 230 is shown as the time between DL transmission 210 and UL transmission 220.

As part of the transition from DL transmission 210 to UL transmission 220, guard period 230 includes a transmitter transient period 240. Transmitter transient period 240 is the time period during which the transmitter changes from OFF to ON or the opposite.

Embodiments of the present invention are implemented to exploit the guard period 230 in a TDD system to continuously capture and sense the uplink RF environment. One consideration involves making the guard period 230 large enough to avoid interference between the DL transmission 210 and UL transmission 220. Guard period 230 may be increased to overcome time-domain interference in the wireless network, such as inter-symbol interference. After the last DL transmission in a TDD sub-frame is sent, but before the first UL transmission is received, the system captures a sensing "snapshot" of the uplink environment.

It is noted that different patterns of DL transmissions and UL transmissions can be sent. For example, a DL transmission can follow another DL transmission. Or, multiple UL transmissions can occur successively. Or, a UL transmission can occur followed by a DL transmission. However, implementations of embodiments of the present invention involve exploiting the guard period when the UL transmission follows the DL transmission.

The information retrieved from the "snapshot" can be sent to a back-end processing system (i.e. computing device 109) for analysis. The back-end system can include one or more computing devices or servers, which are connected to the RAN. For example, machine learning algorithms can be leveraged to identify patterns and predict changes in the environment. Machine learning algorithms include Regression algorithms, Instance-Based algorithms, Regularization algorithms, Decision Tree algorithms, Bayesian algorithms, Clustering algorithms, Association Rule Learning algorithms, Artificial Neural Network algorithms, Deep Learning algorithms, Dimensionality Reduction algorithms, Ensemble algorithms, to name a few.

In order to leverage machine learning algorithms, successive "snapshots" can occur whereby signal information is captured from multiple guard periods. The signal information from a first guard period can be compared to the signal information of a second guard period. Both guard periods can occur during transmissions between the same BTS and UE. The comparison enables the RAN (or the connected computing device) to determine if an object is moving or is stationary.

In addition to the sensing "snapshots," the analysis system (i.e. computing device 109) can make use of ancillary information, such as beam details (in a beamforming system), time of arrival, and angle of arrival for signals.

Figure 3:
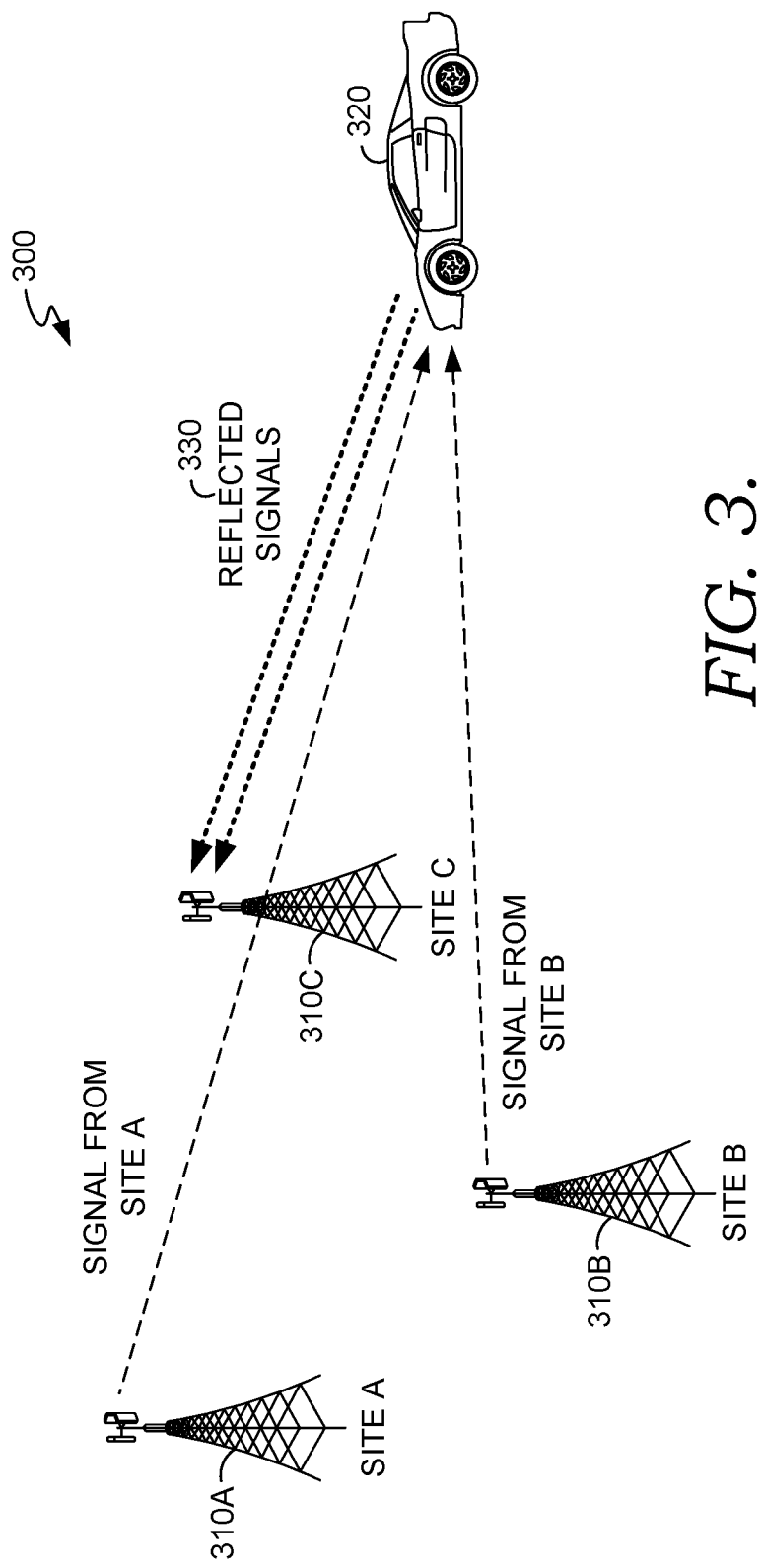
FIG. 3 depicts an exemplary wireless network showing reflected radio frequency (RF) signals, according to an implementation of an embodiment of the present invention.

In FIG. 3, a wireless telecommunications network 300 is shown with cell sites 310A, 310B, and 310C. Cell sites 310A, 310B, and 310C function as BTSs to transmit and receive RF signals with UEs. In FIG. 3, cell sites 310A, 310B, and 310C transmit and receive RF signals for communication purposes. However, in an implementation of an embodiment of the present invention, cell sites 310A, 310B, and 310C can transmit radar signals (which are RF signals) during the guard period 230. The radar signals hit object 320 and return as reflected signals 330 to be captured by cell sites 310A, 310B, and 310C. The captured signals can be stored and processed to identify the location and movement of object 320. If object 320 is stationary, the reflected signals 330 will indicate no velocity. If object 320 is moving, the reflected signals 330 can be processed to determine a velocity and direction of object 320.

Passive radar scenarios can be mimicked with knowledge of signals from neighboring cells, such as cell sites 310A, 310B, and 310C. During the analysis in the computing device 109, the known frequency, phase, and location of other cell sites in the wireless telecommunications network 300 can be used to derive useful information from a given reflection (i.e. reflected signals 330). This solution can also mimic active radar scenarios as discussed above with the transmission and reception of RF signals. For example, the delay and Doppler shift for reflections from the last downlink pilot or reference signal sent from the sensing cell site can be used to determine the distance and velocity of object 320 in a given snapshot. For both scenarios, time-series analyses on a series of snapshots can provide additional information about object 320, such as the location, size, and trajectory. A combination of both passive and active radar techniques can be used to improve accuracy and help calibrate the system.

For active radar calculations in a 5G system operating at mmWave frequencies, object 320 would have to be at least 450 meters (m) from the cell site, assuming a maximum transmitter transient period of three (3) microseconds (μs). For passive radar calculations, the sum of the distance from the neighboring cell site to the reflecting object (i.e. object 320), and from the reflecting object to the sensing cell site would have to be at least 450 m. For a 5G system operating at sub-6 gigahertz (GHz) frequencies, object 320 would have to be at least 1500 m away, assuming a maximum transmitter transient period of ten (10) μs.

Figure 4:
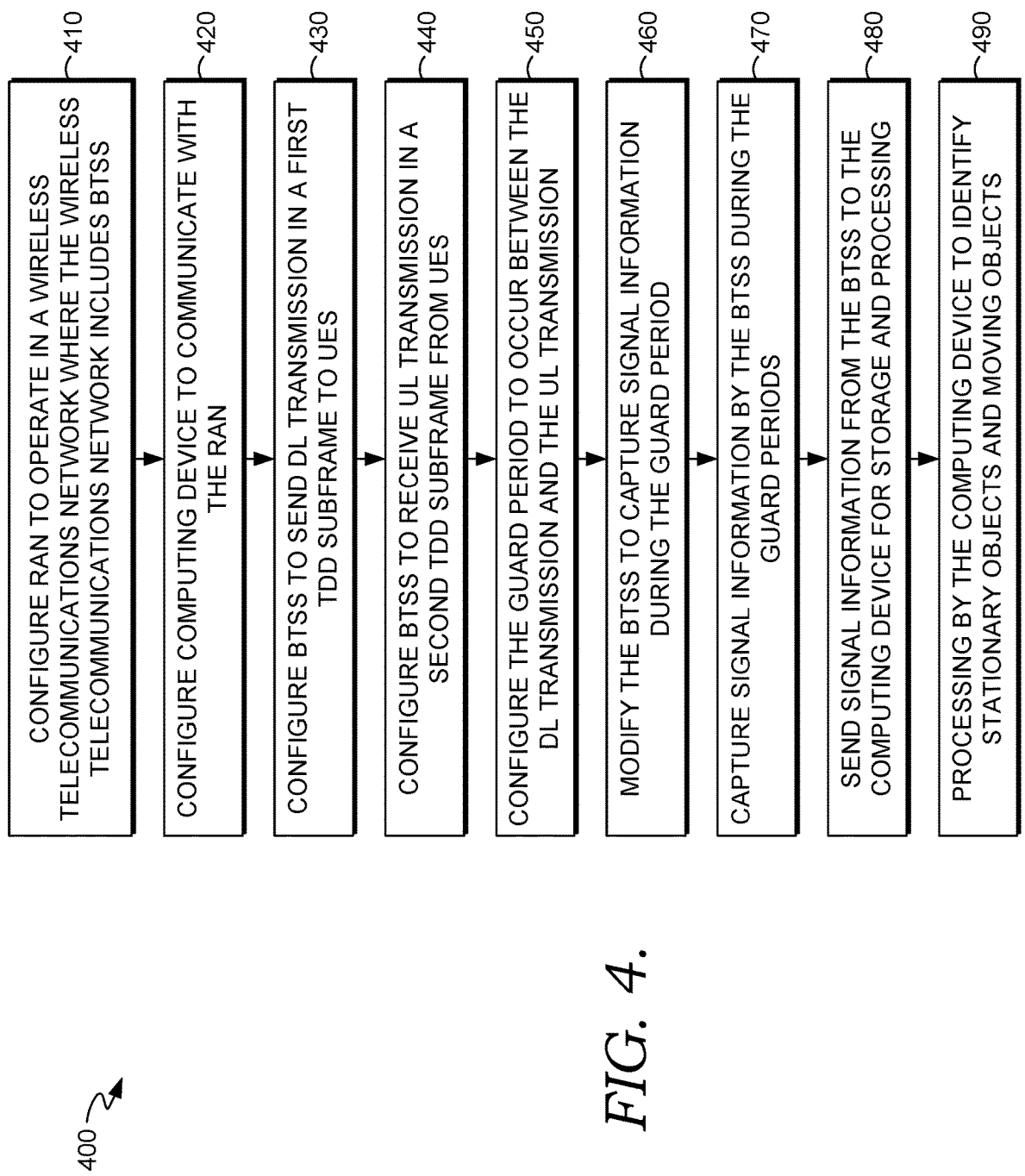
FIG. 4 illustrates a process of incorporating radar technology in a time-division duplex (TDD) radio access network (RAN) using the guard period for sensing.

Turning now to FIG. 4, a method for incorporating radar technology in a time-division duplex (TDD) radio access network (RAN) using the guard period for sensing is provided in a process 400. In a step 410, a RAN is configured to operate in a wireless telecommunications network 300 where the wireless telecommunications network 300 includes BTSs, such as cell sites 310A, 310B, and 310C. Computing device 109 is configured to communicate with the RAN, in a step 420. Cell sites 310A, 310B, and 310C are configured to send DL transmission 210 in a first TDD subframe to UEs in a step 430. In a step 440, cell sites 310A, 310B, and 310C are configured to receive UL transmission 220 in a second TDD subframe from UEs. In a step 450, the guard period 230 is configured to occur between DL transmission 210 and UL transmission 220. Cell sites 310A, 310B, and 310C are modified to capture RF signals during the guard period 230, in a step 460. In a step 470, RF signals are captured by cell sites 310A, 310B, and 310C during the guard periods. RF signals are sent from cell sites 310A, 310B, and 310C to computing device 109 for storage and processing, in a step 480. In a step 490, computing device 109 processes the RF signals as part of a back-end system to identify stationary objects and moving objects, such as object 320.

Figure 5:
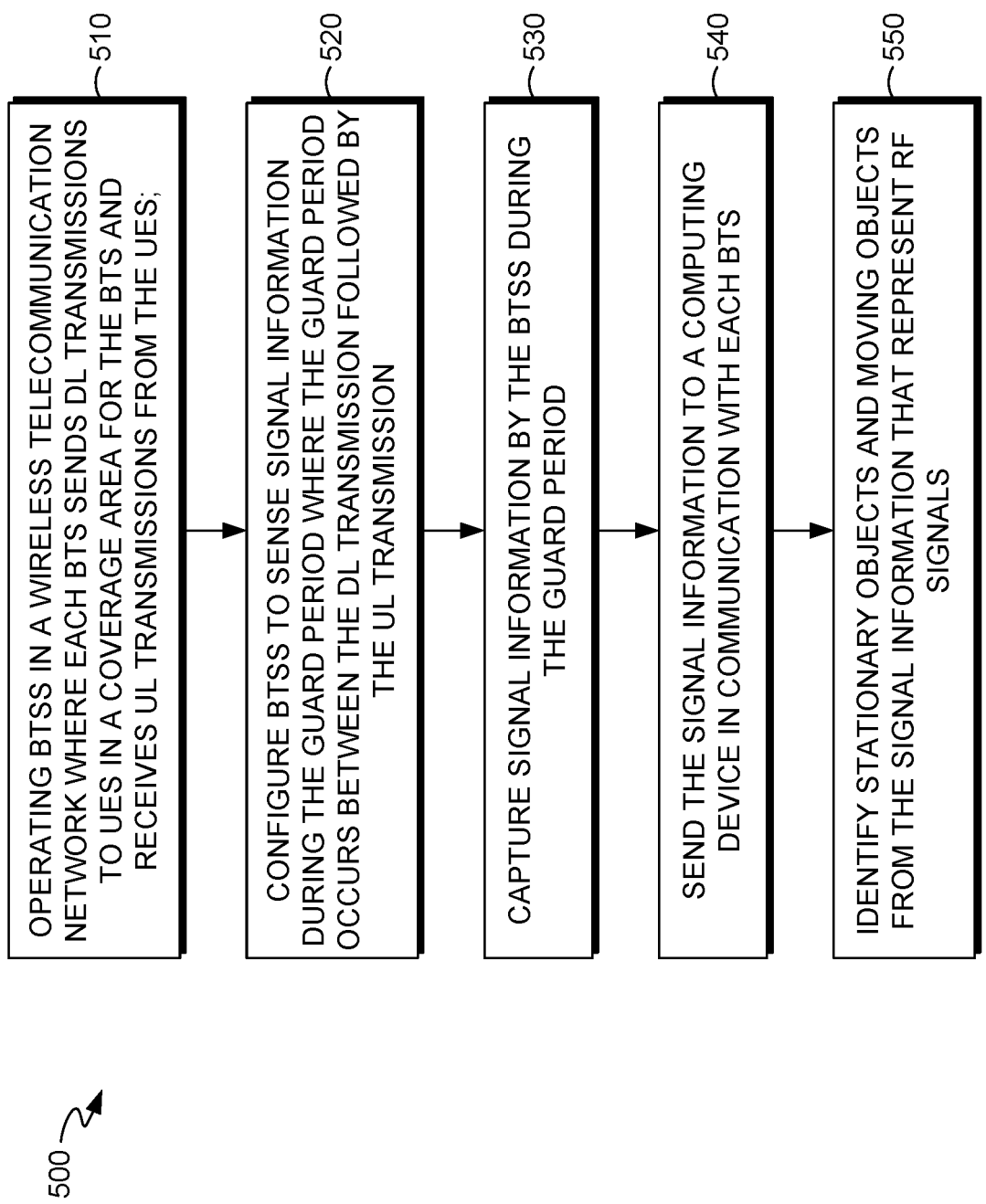
FIG. 5 illustrates another process of incorporating radar technology in a time-division duplex (TDD) radio access network (RAN) using the guard period for sensing.

In FIG. 5, a method for incorporating radar technology in a time-division duplex (TDD) radio access network (RAN) using the guard period for sensing is provided in a process 500. In a step 510, BTSs operate in a wireless telecommunications network 300 where each BTS sends DL transmissions to UEs in a coverage area for the BTS and receives UL transmissions from the UEs. In a step 520, the BTSs are configured to sense RF signals during the guard period 230. The guard period 230 occurs between DL transmission 210 and UL transmission 220. In a step 530, RF signals are captured by BTSs during the guard period 230. In a step 540, the BTSs send the captured RF signals to computing device 109. In a step 550, the RF signals are processed to identify stationary objects and moving objects, such as object 320.

Various embodiments are possible with the present invention. For example, a modification can be made to the transceivers in cell sites 310A, 310B, and 310C to capture the signal information during the guard period. This signal information can be sent to computing device 109 and database 110 for storage and processing. With all the embodiments, the system architecture of the wireless networks or RANs must include computing device or several computing devices to receive, store, process, and analyze signal information (such as RF signals or radar signals). Afterwards, a report can be made of the finding or calculations to other systems, such as support systems for the wireless network, in order to perform orchestration, management, and operations support.

With implementations of embodiments of the present invention, various uses can be performed in terms of a RAN and radar applications. Static objects can be mapped in a coverage area. Static objects can be buildings and other objects that do not move but are permanently fixed in a location. The mapping of the static objects (or buildings) can be done from the perspective of each cell site, such as cell sites 310A, 310B, and 310C.

Moving objects and their trajectories can be identified in a coverage area. Moving objects can include terrestrial or aerial vehicles, such as object 320. Additionally, the present invention can assist in the handover of a UE from one cell site to another cell site. For example, if the UE is located in object 320 and moving, the RAN can communicate with the BTSs to handover the UE to another cell site before the UE moves behind a signal-blocking object, such as a building.

In another embodiment of the present invention, the RAN can assist in maintaining the safety of vehicles within the coverage area, for example to avoid collisions with known obstacles or other vehicles. The RAN could provide automatic traffic control for drones, vessels in a harbor, or flying cars to prevent collisions.

In yet another embodiment of the present invention, the RAN can identify changes to an antenna or other system configurations. For example, if all known static objects shift suddenly in the same direction, it can be assumed that the antenna was realigned. Additionally, the RAN could detect seismic activity if objects that should be stationary are detected to be moving in a way consistent with earthquake patterns.

Even further, implementations of embodiments of the present invention can include making changes to the guard period (230). As discussed above, the static sources could be buildings, permanent objects, trees, etc. Additionally, changes can be made to the guard period to assist with and optimize beamforming assignments.

Figure 6:
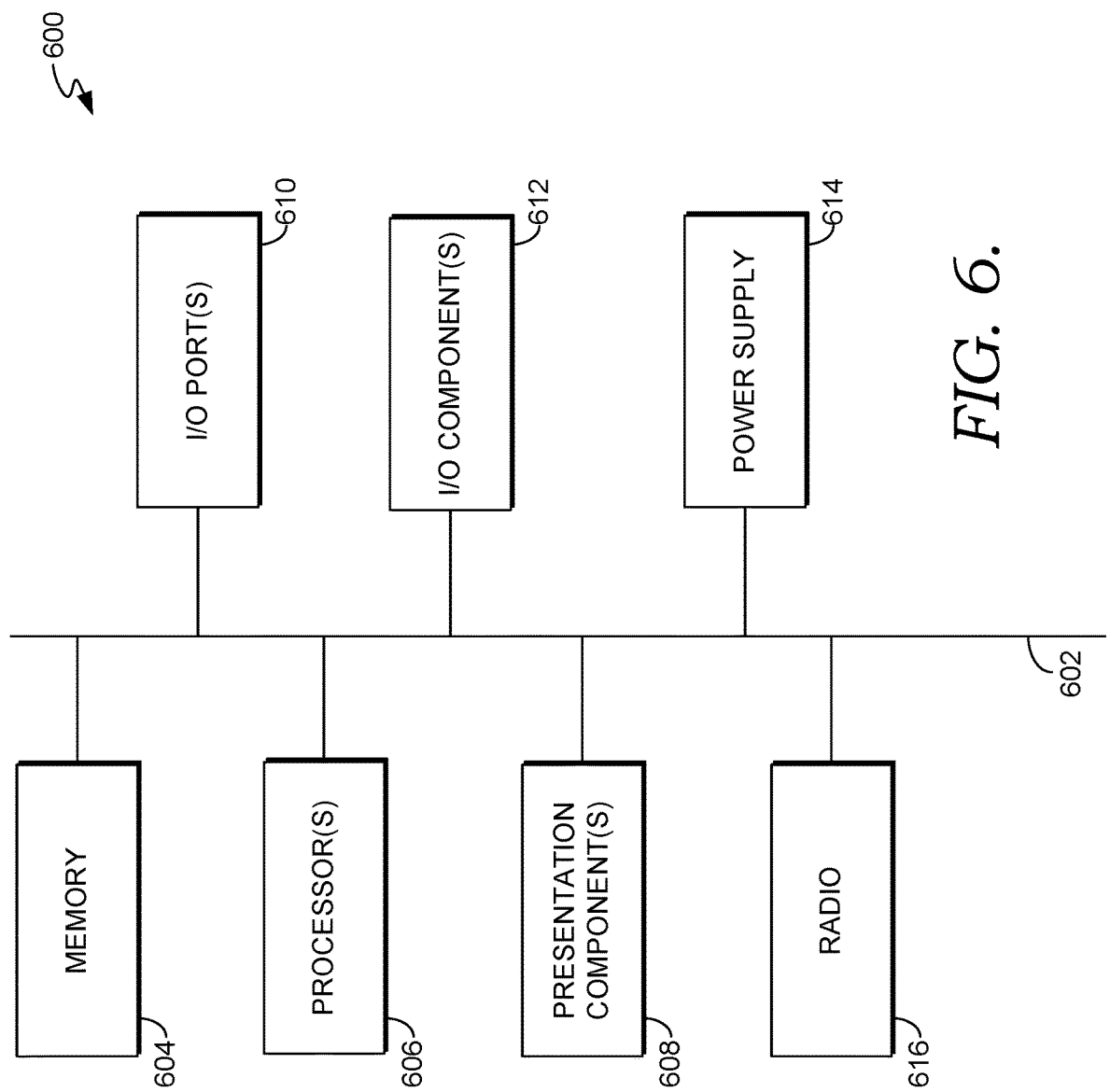
FIG. 6 depicts a block diagram of an exemplary computing environment suitable for use in implementing embodiments herein.

With reference to FIG. 6, computing device 600 includes a bus 602 that directly or indirectly couples the following devices: memory 604, one or more processors 606, one or more presentation components 608, input/output (I/O) ports 610, input/output (I/O) components 612, and an illustrative power supply 614. Bus 602 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterate that the diagram of FIG. 6 is merely illustrative of an example computing device that can be used in connection with one or more embodiments of the present invention. Distinction is not made between such categories as "workstation," "server," "laptop," "handheld device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 604 includes computer-storage media in the form of volatile and/or nonvolatile memory. The memory may be removable, non-removable, or a combination thereof. Example hardware devices include solid-state memory, hard drives, optical-disc drives, etc. Computing device 600 includes one or more processors that read data from various entities such as memory 604 or I/O components 612. Presentation component(s) 608 present data indications to a user or other device. Example presentation components include a display device, speaker, printing component, vibrating component, etc.

I/O ports 610 allow computing device 600 to be logically coupled to other devices including I/O components 612, some of which may be built in. Illustrative components include a microphone, joystick, game pad, satellite dish, scanner, printer, wireless device, etc.

Radio 616 represents a radio that facilitates communication with a wireless telecommunications network. Illustrative wireless telecommunications technologies include CDMA, GPRS, TDMA, GSM, W-CDMA, EDGE, CDMA2000, and the like. Radio 616 might additionally or alternatively facilitate other types of wireless communications including Wi-Fi, WiMAX, LTE, 5G, or other VoIP communications. As can be appreciated, in various embodiments, radio 616 can be configured to support multiple technologies and/or multiple radios can be utilized to support multiple technologies.

The invention claimed is:

1. A system for incorporating radar technology in a time-division duplex (TDD) radio access network (RAN) using a guard period for sensing, comprising:
    the RAN configured to operate in a wireless telecommunication network to implement a radio access technology, wherein the wireless telecommunication network includes a plurality of base transceiver stations (BTS) and a plurality of user equipment (UEs);
    at least one computing device, located outside of the RAN and the plurality of UEs, configured to communicate with the RAN;
    the plurality of BTSs configured to send a downlink (DL) transmission in a first TDD subframe to the plurality of UEs;
    the plurality of BTSs configured to receive an uplink (UL) transmission in a second TDD subframe from the plurality of UEs;
    the guard period configured to occur between the DL transmission and the UL transmission, wherein the plurality of BTSs captures information about an uplink radio frequency (RF) environment during the guard period; and
    as the DL transmissions, guard periods, and UL transmissions occur, the plurality of BTSs captures a plurality of information during a plurality of guard periods, wherein the plurality of BTSs sends the plurality of information to the at least one computing device, wherein a member of the plurality of information represents information from a particular guard period, wherein the plurality of information represents a reflection of radio waves that identifies a plurality of objects, wherein the radio waves are RF signals, and wherein the plurality of objects are stationary objects and moving objects.

2. The system of claim 1, further comprising the at least one computing device analyzes the plurality of information, wherein the at least one computing device compares a first member of the plurality of information from a first guard period at a BTS to a second member of the plurality of information from a second guard period at the BTS to determine a movement of a moving object and to determine a stationary object.

3. The system of claim 2, wherein a determination of the movement of the moving object includes the determination of a velocity of the moving object and the determination of a movement direction of the moving object.

4. The system of claim 3, further comprising the RAN providing instructions to perform a handover from one BTS to another BTS before the moving object encounters a signal-blocking object.

5. The system of claim 2, further comprising the at least one computing device maps stationary objects from a perspective of each cell site in a wireless coverage area and provides a graphical representation of the stationary objects in a map to a graphical user interface.

6. The system of claim 2, further comprising the RAN configured to send instructions to the plurality of BTSs to transmit RF signals in order to obtain reflected RF signals from the stationary objects and moving objects.

7. The system of claim 2, further comprising the system configured to maintain safety of vehicles within in a wireless coverage area, wherein the system provides a notice to the moving object to avoid a collision with an obstacle.

8. The system of claim 2, further comprising the system configured to identify a change to an antenna when a position of a plurality of stationary objects shifts in a same direction, which correlates to the antenna is realigned.

9. A method for incorporating radar technology in a time-division duplex (TDD) radio access network (RAN) using a guard period for sensing, comprising:
   configuring the RAN to operate in a wireless telecommunication network to implement a radio access technology, wherein the wireless telecommunication network includes a plurality of base transceiver stations (BTS) and a plurality of user equipment (UEs);
   configuring at least one computing device, located outside of the RAN and the plurality of UEs, to communicate with the RAN;
   configuring the plurality of BTSs to send a downlink (DL) transmission in a first TDD subframe to the plurality of UEs;
   configuring the plurality of BTSs to receive an uplink (UL) transmission in a second TDD subframe from the plurality of UEs;
   configuring the guard period to occur between the DL transmission and the UL transmission;
   modifying the plurality of BTSs to capture signal information during the guard period, wherein the plurality of BTSs captures the signal information about an uplink radio frequency (RF) environment during the guard period;
   capturing a plurality of signal information by the plurality of BTSs during a plurality of guard periods; and
   sending the signal information from the plurality of BTSs to the at least one computing device for storage and processing; wherein a member of the plurality of signal information represents signal information from a particular guard period, wherein the plurality of signal information represents a reflection of radio waves that identifies a plurality of objects, wherein the radio waves are RF signals, and wherein the plurality of objects are stationary objects and moving objects.

10. The method of claim 9, further comprising analyzing the plurality of signal information by the at least one computing device, wherein analyzing the plurality of signal information includes 1) comparing a first member of the plurality of signal information from a first guard period at a BTS to a second member of the plurality of signal information from a second guard period at the BTS, 2) determining a movement of a moving object, and 3) determining a stationary object.

11. The method of claim 10, wherein determining the movement of the moving object includes determining a velocity of the moving object and determining a movement direction of the moving object.

12. The method of claim 11, further comprising providing instructions to perform a handover from one BTS to another BTS by the RAN before the moving object encounters a signal-blocking object.

13. The method of claim 10, further comprising mapping stationary objects by the at least one computing device from a perspective of each cell site in a wireless coverage area and providing a graphical representation of the stationary objects in a map to a graphical user interface.

14. The method of claim 10, further comprising configuring the RAN to send instructions to the plurality of BTSs to transmit RF signals in order to obtain reflected RF signals from stationary objects and moving objects.

15. The method of claim 10, further comprising configuring the RAN to maintain safety of vehicles within in a wireless coverage area, wherein configuring the RAN include providing a notice to the moving object to avoid a collision with an obstacle.

16. The method of claim 10, further comprising configuring the RAN to identify a change to an antenna when a position of a plurality of stationary objects shifts in a same direction, correlating to the antenna being realigned.

17. The method of claim 10, further comprising reporting findings or calculations by the at least one computing device to support systems of the RAN.

18. A system for incorporating radar technology in a time-division duplex (TDD) radio access network (RAN) using a guard period for sensing, comprising:
   a plurality of base transceiver stations (BTS) operating in a wireless telecommunication network, wherein each BTS sends DL transmissions to a plurality of user equipment (UEs) in a coverage area for the BTS and receives UL transmissions from the plurality of UEs;
   each BTS configured to sense signal information during the guard period, wherein the guard period occurs between the DL transmission and the UL transmission; and
   each BTS captures signal information during the guard period and sends the signal information to at least one computing device, located outside of the RAN and the plurality of UEs, in communication with each BTS, wherein the signal information represents RF signals that identify a plurality of stationary objects and a plurality of moving objects.

19. The system of claim 18, further comprising the RAN configured to send instructions to the plurality of BTSs to transmit RF signals in order to obtain reflected RF signals from the stationary objects and moving objects.

20. The system of claim 19, wherein the at least one computing device analyzes the signal information to compare signal information from different guard periods or successive guard periods, to determine a movement of the moving object, and to determine the stationary object.

* * * * *